United States Patent
Matsen et al.

(10) Patent No.: US 8,708,691 B2
(45) Date of Patent: *Apr. 29, 2014

(54) APPARATUS FOR RESIN TRANSFER MOLDING COMPOSITE PARTS

(71) Applicant: The Boeing Company, Chicago, IL (US)

(72) Inventors: Marc R. Matsen, Seattle, WA (US); Kim E. Peterson, Bellevue, WA (US); William Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/722,670

(22) Filed: Dec. 20, 2012

(65) Prior Publication Data

US 2013/0122764 A1 May 16, 2013

Related U.S. Application Data

(60) Division of application No. 11/859,098, filed on Sep. 21, 2007, now Pat. No. 8,372,327, which is a continuation-in-part of application No. 11/854,733, filed on Sep. 13, 2007, now Pat. No. 8,017,059.

(51) Int. Cl.
  *B29C 45/02* (2006.01)
  *B21D 37/16* (2006.01)
  *B29C 35/02* (2006.01)

(52) U.S. Cl.
  USPC ............. 425/543; 425/547; 425/407; 249/78; 249/80; 249/115; 249/116; 264/259; 264/319; 264/403; 264/328.1; 72/342.5; 72/342.92; 148/574; 219/618; 219/632; 219/634

(58) Field of Classification Search
  CPC .......... B29C 35/02; B29C 45/02; B21D 7/16; B23K 13/02; H05B 6/14
  USPC .................. 249/78–81, 114.1–115, 134–135; 425/407, 547, 543; 264/319–320, 327, 264/403, 259, 328.1; 72/342.5, 342.92; 148/574; 219/618, 632, 634
  See application file for complete search history.

(56) References Cited

U.S. PATENT DOCUMENTS

| | | | |
|---|---|---|---|
| 1,910,015 A | 5/1933 | Homand |
| 2,106,614 A | 1/1938 | Lindner |

(Continued)

FOREIGN PATENT DOCUMENTS

| | | |
|---|---|---|
| FR | 2696676 A1 | 4/1994 |
| GB | 2430177 A1 | 3/2007 |

(Continued)

OTHER PUBLICATIONS

Notice of Allowance, dated Jun. 6, 2013, reagrding U.S. Appl. No. 13/177,403, 19 pages.

(Continued)

*Primary Examiner* — Dimple Bodawala
(74) *Attorney, Agent, or Firm* — Yee & Associates, P.C.

(57) ABSTRACT

A composite fabrication apparatus which may include a first tooling die and a second tooling die movable with respect to each other; a temperature control system having induction coils disposed in thermal contact with the first tooling die and the second tooling die; a first die susceptor provided on the first tooling die and a second die susceptor provided on the second tooling die and connected to the induction coils; and a cooling system disposed in thermal contact with the first tooling die and the second tooling die. A resin transfer system delivers resin from a resin source to the tooling dies to allow resin transfer molding. A composite fabrication method is also disclosed.

21 Claims, 8 Drawing Sheets

(56) References Cited

U.S. PATENT DOCUMENTS

| | | | |
|---|---|---|---|
| 2,317,597 A | 4/1943 | Ford et al. | |
| 2,993,786 A | 7/1961 | Roboff et al. | |
| 3,413,392 A | 11/1968 | Meadows | |
| 3,454,685 A | 7/1969 | Roy et al. | |
| 3,650,042 A | 3/1972 | Boerger et al. | |
| 3,763,293 A * | 10/1973 | Nussbaum | 264/415 |
| 4,182,397 A | 1/1980 | Schmucker et al. | |
| 4,217,325 A | 8/1980 | Colby | |
| 4,327,045 A | 4/1982 | Nishikawa et al. | |
| 4,482,306 A * | 11/1984 | Hahn | 425/4 R |
| 4,527,970 A | 7/1985 | Murley | |
| 4,596,694 A | 6/1986 | Rozmus | |
| 4,597,730 A | 7/1986 | Rozmus | |
| 4,636,341 A | 1/1987 | Murley | |
| 4,683,018 A | 7/1987 | Sutcliffe et al. | |
| 4,724,123 A | 2/1988 | Rozmus, Jr. | |
| 4,761,262 A | 8/1988 | Ogata et al. | |
| 4,940,563 A | 7/1990 | Kromrey | |
| 4,983,341 A | 1/1991 | Kromrey | |
| 4,983,345 A | 1/1991 | Kromrey | |
| 5,009,687 A | 4/1991 | Kromrey | |
| 5,037,592 A * | 8/1991 | Erlenbach | 264/51 |
| 5,049,053 A | 9/1991 | Tabaru | |
| 5,049,329 A | 9/1991 | Allaire et al. | |
| 5,064,597 A | 11/1991 | Kim | |
| 5,188,692 A | 2/1993 | Horvath | |
| 5,225,015 A | 7/1993 | Allaire et al. | |
| 5,338,372 A | 8/1994 | Tabaru | |
| 5,338,497 A | 8/1994 | Murray et al. | |
| 5,410,132 A | 4/1995 | Gregg et al. | |
| 5,413,661 A | 5/1995 | Spengler et al. | |
| 5,483,043 A | 1/1996 | Sturman, Jr. et al. | |
| 5,529,479 A | 6/1996 | Souders | |
| 5,530,227 A | 6/1996 | Matsen et al. | |
| 5,591,369 A | 1/1997 | Matsen et al. | |
| 5,591,370 A | 1/1997 | Matsen et al. | |
| 5,592,988 A | 1/1997 | Meroni et al. | |
| 5,599,472 A | 2/1997 | Brown et al. | |
| 5,645,744 A | 7/1997 | Matsen et al. | |
| 5,683,608 A | 11/1997 | Matsen et al. | |
| 5,705,794 A | 1/1998 | Gillespie et al. | |
| 5,728,309 A | 3/1998 | Matsen et al. | |
| 5,747,179 A | 5/1998 | Matsen et al. | |
| 5,772,946 A | 6/1998 | Kaminaga et al. | |
| 5,808,281 A | 9/1998 | Matsen et al. | |
| 5,885,504 A | 3/1999 | David et al. | |
| 5,989,008 A | 11/1999 | Wytkin | |
| 6,040,563 A | 3/2000 | Matsen et al. | |
| 6,149,844 A | 11/2000 | Graham | |
| 6,211,497 B1 | 4/2001 | Matsen et al. | |
| 6,221,813 B1 | 4/2001 | Riedel et al. | |
| 6,283,195 B1 | 9/2001 | Chandley et al. | |
| 6,284,089 B1 | 9/2001 | Anderson et al. | |
| 6,299,819 B1 | 10/2001 | Han | |
| 6,310,327 B1 | 10/2001 | Moore et al. | |
| 6,524,511 B1 | 2/2003 | Ueki et al. | |
| 6,528,771 B1 | 3/2003 | Matsen et al. | |
| 6,529,796 B1 | 3/2003 | Kroeger et al. | |
| 6,565,792 B2 | 5/2003 | Hemphill | |
| 6,565,942 B2 | 5/2003 | Anderson et al. | |
| 6,566,635 B1 | 5/2003 | Matsen et al. | |
| 6,653,608 B1 | 11/2003 | Matsen et al. | |
| 6,747,253 B1 | 6/2004 | Firth et al. | |
| 6,812,271 B2 | 11/2004 | Swartz et al. | |
| 6,840,750 B2 | 1/2005 | Thrash et al. | |
| 6,855,917 B2 | 2/2005 | Matsen et al. | |
| 6,884,966 B2 | 4/2005 | Coleman et al. | |
| 6,897,419 B1 | 5/2005 | Brown et al. | |
| 6,906,300 B2 | 6/2005 | Brown et al. | |
| 6,914,225 B2 | 7/2005 | Fischer et al. | |
| 6,979,807 B2 | 12/2005 | Anderson et al. | |
| 6,991,446 B2 | 1/2006 | Byma et al. | |
| 7,024,897 B2 | 4/2006 | Pfaffmann et al. | |
| 7,037,465 B2 | 5/2006 | Ogawa | |
| 7,102,112 B2 | 9/2006 | Anderson et al. | |
| 7,109,451 B2 | 9/2006 | Brown et al. | |
| 7,159,836 B2 | 1/2007 | Parks et al. | |
| 7,269,986 B2 | 9/2007 | Pfaffmann et al. | |
| 7,351,054 B2 | 4/2008 | Bachan | |
| 7,419,631 B2 | 9/2008 | Guichard et al. | |
| 7,497,981 B2 | 3/2009 | Graham | |
| 7,866,969 B2 | 1/2011 | Ruiz et al. | |
| 7,905,128 B2 | 3/2011 | Matsen et al. | |
| 7,926,285 B2 | 4/2011 | Tisdale et al. | |
| 8,017,059 B2 * | 9/2011 | Matsen et al. | 264/403 |
| 8,343,402 B1 * | 1/2013 | Matsen et al. | 264/125 |
| 8,372,327 B2 * | 2/2013 | Matsen et al. | 264/258 |
| 8,375,758 B1 * | 2/2013 | Matsen et al. | 72/60 |
| 8,383,998 B1 * | 2/2013 | Matsen et al. | 219/618 |
| 8,480,823 B1 * | 7/2013 | Matsen et al. | 148/574 |
| 2002/0025423 A1 | 2/2002 | Dreher et al. | |
| 2002/0117238 A1 | 8/2002 | Krajewski | |
| 2004/0101429 A1 | 5/2004 | Ogawa | |
| 2004/0194424 A1 | 10/2004 | Frost et al. | |
| 2005/0045303 A1 | 3/2005 | Itoyama et al. | |
| 2005/0069600 A1 | 3/2005 | Scolamiero et al. | |
| 2005/0145309 A1 | 7/2005 | Coleman et al. | |
| 2005/0151555 A1 | 7/2005 | Lewis et al. | |
| 2005/0263673 A1 * | 12/2005 | Bachan | 249/79 |
| 2006/0102316 A1 | 5/2006 | Itoyama et al. | |
| 2006/0131473 A1 * | 6/2006 | Bachan | 249/79 |
| 2007/0000602 A1 | 1/2007 | Sprague | |
| 2007/0160822 A1 | 7/2007 | Bristow et al. | |
| 2007/0241482 A1 | 10/2007 | Giller et al. | |
| 2009/0071217 A1 * | 3/2009 | Matsen et al. | 72/342.3 |
| 2009/0074905 A1 * | 3/2009 | Matsen et al. | 425/547 |
| 2010/0018271 A1 * | 1/2010 | Matsen et al. | 72/19.1 |
| 2010/0065552 A1 * | 3/2010 | Matsen et al. | 219/671 |
| 2011/0006460 A1 | 1/2011 | Vander Wel et al. | |
| 2011/0229720 A1 * | 9/2011 | Matsen et al. | 428/411.1 |
| 2011/0262575 A1 * | 10/2011 | Matsen et al. | 425/174.8 R |
| 2013/0134154 A1 * | 5/2013 | Matsen et al. | 219/634 |

FOREIGN PATENT DOCUMENTS

| | | |
|---|---|---|
| WO | 2009036473 A2 | 3/2009 |
| WO | 2011115716 A1 | 9/2011 |

OTHER PUBLICATIONS

Office Action, dated May 29, 2012, regarding U.S. Appl. No. 12/625,354, 20 pages.

Notice of Allowance, dated Sep. 17, 2012, regarding U.S. Appl. No. 12/625,354, 8 pages.

Office Action, dated Mar. 4, 2013, regarding U.S. Appl. No. 13/177,403, 26 pages.

Office Action, dated Sep. 28, 2012, regarding U.S. Appl. No. 12/817,459, 13 pages.

Notice of Allowance, dated Mar. 11, 2013, regarding U.S. Appl. No. 12/817,459, 8 pages.

Notice of Allowance, dated Jun. 26, 2012, regarding U.S. Appl. No. 12/835,207, 10 pages.

International search report dated Jun. 12, 2009 regarding application PCT/US2008/077039, 5 pages. (WO2009036473).

International search report dated Jun. 6, 2011 application PCT/US2011/024843, 3 pages. (WO2011115716).

Non-final office action dated Dec. 22, 2011 regarding U.S. Appl. No. 11/859,098, 18 pages.

Non-final office action dated Nov. 8, 2011 regarding U.S. Appl. No. 12/724,473, 15 pages.

Final office action dated Mar. 29, 2012 regarding U.S. Appl. No. 12/724,473, 13 pages.

Matsen et al., "Consolidation of Composite Material," U.S. Appl. No. 12/625,354, filed Nov. 24, 2009, 37 pages.

Matsen et al., "Induction Forming of Metal Components with Integral Heat Treatment," U.S. Appl. No. 12/817,459, filed Jun. 17, 2010, 43 pages.

Matsen et al., "Induction Forming of Metal Components with Slotted Susceptors," U.S. Appl. No. 12/835,207, filed Jul. 13, 2010, 40 pages.

Notice of allowance dated Jun. 21, 2012 U.S. Appl. No. 11/859,098, 8 pages.

(56) References Cited

OTHER PUBLICATIONS

Non-final office action dated Aug. 17, 2009 regarding U.S. Appl. No. 11/854,733, 14 pages.
Final office action dated Mar. 1, 2010 regarding U.S. Appl. No. 11/854,733, 13 pages.
Non-final office action dated Jul. 19, 2010 regarding U.S. Appl. No. 11/854,733, 10 pages.
Final office action dated Feb. 1, 2011 regarding U.S. Appl. No. 11/854,733, 5 pages.
Notice of allowance dated May 19, 2011 regarding U.S. Appl. No. 11/854,733, 5 pages.
Non-final office action dated Nov. 5, 2009 regarding U.S. Appl. No. 11/859,098, 29 pages.
Final office action dated May 25, 2010 regarding U.S. Appl. No. 11/859,098, 21 pages.
Notice of allowance dated Oct. 3, 2012 regarding U.S. Appl. No. 11/859,098, 21 pages.
Final office action dated Jul. 5, 2012 regarding U.S. Appl. No. 13/177,403, 13 pages.
Non-final office dated Jan. 30, 2012 regarding U.S. Appl. No. 13/177,403, 17 pages.

* cited by examiner

APPARATUS FOR RESIN TRANSFER MOLDING COMPOSITE PARTS

CROSS REFERENCE TO RELATED APPLICATIONS

This application is a divisional of application Ser. No. 11/859,098, filed Sep. 21, 2007, now issued as U.S. Pat. No. 8,372,327, which is a continuation-in-part of U.S. patent application Ser. No. 11/854,733, filed Sep. 13, 2007, now issued as U.S. Pat. No. 8,017,059.

TECHNICAL FIELD

The disclosure generally relates to composite fabrication apparatus and methods, and deals more particularly with a resin transfer molding apparatus and method that optimizes the performance of a molded composite part.

BACKGROUND

Processing techniques and facilities that enable widespread use of resin transfer molded composite components at rates and costs that allow significant weight savings scenarios are desirable in some applications. The capability to rapidly heat, consolidate and cool in a controlled manner may be required for high production rates of composite components. Current processing techniques include the use of heated dies, and therefore, may not allow for the optimum controlled cool-down which may be required optimized fabrication. Furthermore, current processing techniques may have limitations in forming the desired components since such techniques may have limitations in the capability to establish optimal thermal cycles to meet both producability and affordability goals while establishing the optimal material properties.

SUMMARY

The disclosed embodiments provide a method and apparatus for resin transfer molding composite parts that provides rapid heating and cool down of the part by using tooling that has a relatively small thermal mass which is directly coupled to a temperature control system. Contoured susceptors forming a mold cavity are inductively coupled with electric coils that rapidly heat the susceptors, allowing precise tailoring of thermal and pressure profiles. The temperature control system also includes means for rapidly cooling the susceptors to enhance process control. The susceptors are configured to allow the flow of resin into the mold cavity using a resin transfer system.

According to one disclosed embodiment, a resin transfer molding apparatus is provided comprising: a pair of tooling dies each including a plurality of stacked metal sheets; first and second susceptors respectively mounted on the first and second dies, and including contoured surfaces defining a mold cavity for molding a part; a temperature control system including induction coils inductively coupled with the first and second susceptors; and, a resin transfer system for delivering resin from a resin source to the mold cavity. The tooling dies may include contoured faces respectively matching the contoured surfaces of the susceptors. A dielectric shell may be disposed between the susceptors and the corresponding tooling dies. The stacked metal sheets may be spaced apart to define air gaps through which a coolant may flow in order to provide rapid cool down of the susceptors.

According to another disclosed embodiment, a resin transfer molding apparatus is provided, comprising a pair of tooling dies respectively including matching contoured faces and a plurality of passageways extending generally transverse to the contoured faces; first and second susceptors respectively mounted on the contoured faces of the tooling dies and including contoured surfaces defining a mold cavity for molding a part; a temperature control system; and, a resin transfer system coupled with the tooling dies for delivering resin from a resin source to the mold cavity. The temperature control system may include induction coils inductively coupled with the first and second susceptors for heating the susceptors. The temperature control system may further control means for delivering coolant through the passageways to cool the first and second susceptors. The apparatus may further include a dielectric shell disposed between each of the susceptors and a corresponding tooling die. The tooling dies may include a plurality of stacked metal sheets, wherein the passageways are defined between the metal sheets. The susceptors may include one or more openings that allow inflow of resin into the mold cavity, and venting of excess resin from the mold cavity.

According to a disclosed method embodiment, molding a composite part comprises the steps of: placing susceptors in a mold cavity; introducing a fiber preform into the mold cavity, in contact with the susceptors; heating the mold cavity by inductively heating the susceptors; infusing the preform with resin to form a part by transferring resin from a resin source into the mold cavity; cooling the part by cooling the susceptors; and, removing the part after the part has been cooled. The part may be cooled by flowing a cooling medium over the susceptors. The cooling medium may be delivered to the susceptors through passageways in a die. The resin may be transferred from the resin source through one or more openings in one of the susceptors.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Referring initially to FIGS. 1-7 of the drawings, a stacked tooling apparatus which is suitable for implementation of the composite fabrication method is generally indicated by reference numeral 1. The stacked tooling apparatus 1 may include a first die frame 2 and a second die frame 8. A first tooling die 3 may be provided on the first die frame 2, and a second tooling die 9 may be provided on the second die frame 8. The first tooling die and the second tooling die 9 may be hydraulically-actuated to facilitate movement of the first tooling die 3 and the second tooling die 9 toward and away from each other. The first tooling die 3 may have a first contoured die surface 4, whereas the second tooling die 9 may have a second contoured die surface 10 which is complementary to the first contoured die surface 4 of the first tooling die 3.

Figure 5:
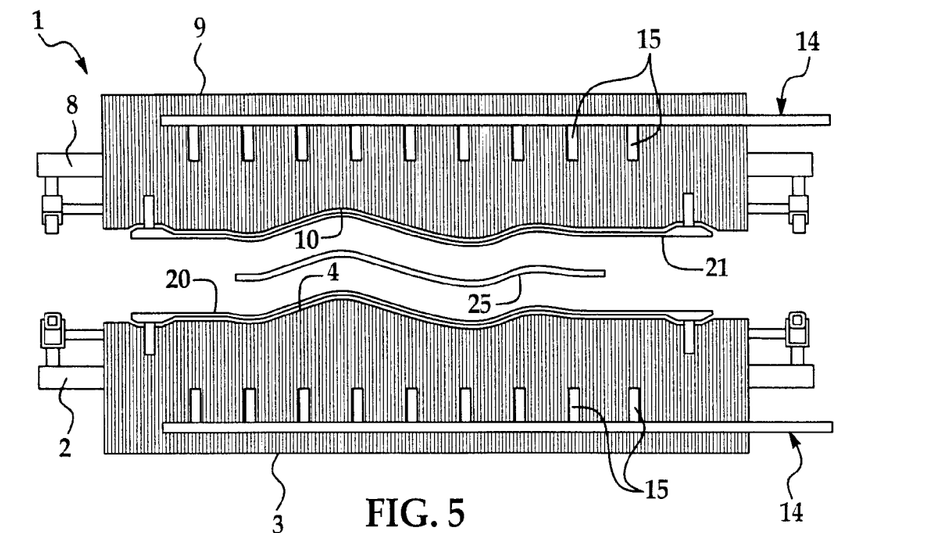
FIG. 5 is a sectional view of the tooling dies, with the tooling dies and die susceptors released from the composite sheet after forming and cooling of the composite sheet.
Figure 6:
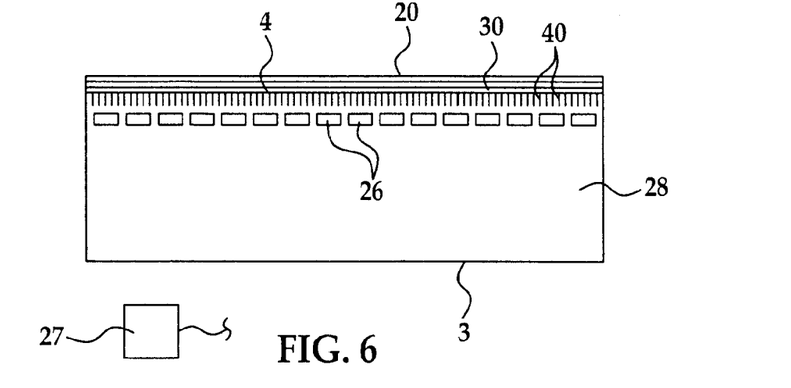
FIG. 6 is a schematic view of a tooling die, more particularly illustrating a die susceptor and die liner provided on the engaging surface of the tooling die and multiple induction coils extending through the tooling die.

As shown in FIG. 6, multiple induction coils 26 may extend through each of the first tooling die 3 (and the second tooling die 9, not shown) to facilitate selective heating of the first tooling die 3 and the second tooling die 9. A temperature control system 27 may be connected to the induction coils 26. A first die susceptor 20 may be thermally coupled to the induction coils 26 of the first tooling die 3. A second die susceptor 21 may be thermally coupled to the induction coils 26 of the second tooling die 9. Each of the first die susceptor 20 and the second die susceptor 21 may be a thermally-conductive material such as, but not limited to, a ferromagnetic material, cobalt, nickel, or compounds thereof. As shown in FIGS. 1-5, the first die susceptor 20 may generally conform to the first contoured die surface 4 and the second die susceptor 21 may generally conform to the second contoured die surface 10.

As shown in FIG. 6, an electrically and thermally insulative coating 30 may be provided on the first contoured die surface 4 of the first tooling die 3, as shown, and on the second contoured die surface 10 of the second tooling die 9. The electrically and thermally insulative coating 30 may be, for example, alumina or silicon carbide. The first die susceptor 20 may be provided on the electrically and thermally insulative coating of the first tooling die 3, as shown, and the second die susceptor 21 may be provided on the electrically and thermally insulative coating 30 of the second tooling die 9.

Figure 4:
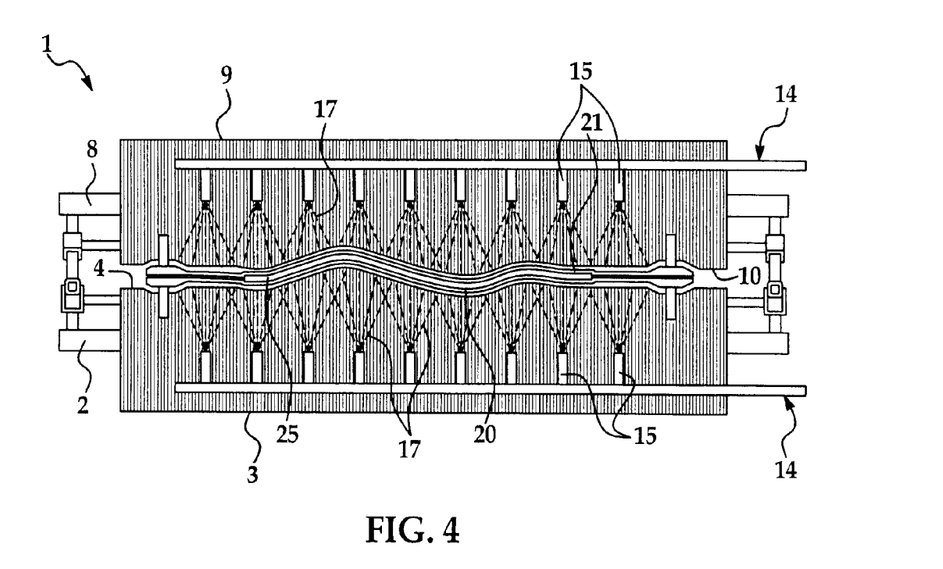
FIG. 4 is a sectional view of the tooling dies, with the tooling dies closed against the die susceptors and composite sheet and a cooling system engaged to cool the tooling dies.

As shown in FIGS. 1-5, a cooling system 14 may be provided in each of the first tooling die 3 and the second tooling die 9. The cooling system 14 may include, for example, coolant conduits 15 which have a selected distribution throughout each of the first tooling die 3 and the second tooling die 9. As shown in FIG. 4, the coolant conduit 15 may be adapted to discharge a cooling medium 17 into the first tooling die 3 or the second tooling die 9. The cooling medium 17 may be a liquid, gas or gas/liquid mixture which may be applied as a mist or aerosol, for example.

Figure 7:
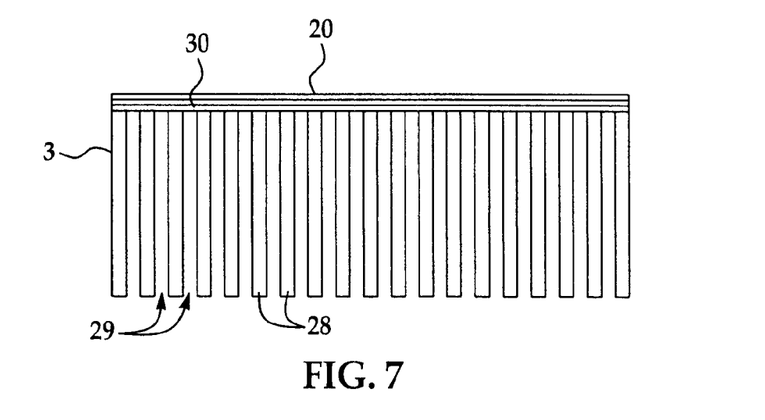
FIG. 7 is a front sectional view of a tooling die, more particularly illustrating multiple induction coils and multiple thermal expansion slots provided in the metal sheet.

Each of the first tooling die 3 and the second tooling die 9 may each include multiple stacked metal sheets 28 such as stainless steel which are trimmed to the appropriate dimensions for the induction coils 26. This is shown in FIGS. 6 and 7. The stacked metal sheets 28 may be oriented in generally perpendicular relationship with respect to the first contoured die surface 4 and the second contoured die surface 10. Each metal sheet 28 may have a thickness of from about 1/16" to about 1/4" for example and preferably 1/8". An air gap 29 may be provided between adjacent stacked metal sheets 28 to facilitate cooling of the first tooling die 3 and the second tooling die 9. The stacked metal sheets 28 may be attached to each other using clamps (not shown), fasteners (not shown) and/or other suitable technique known to those skilled in the art. The stacked metal sheets 28 may be selected based on their electrical and thermal properties and may be transparent to the magnetic field. An electrically insulating coating (not shown) may, optionally, be provided on each side of each stacked sheet 28 to prevent flow of electrical current between the stacked metal sheets 28. The insulating coating may be a material such as ceramic, for example, or other high temperature resistant materials. However, if an air gap exists inbetween the stacked sheets, then no coating would be necessary. Multiple thermal expansion slots 40 may be provided in each staked sheet 28, as shown in FIG. 6, to facilitate thermal expansion and contraction of the stacked tooling apparatus 1.

Figure 1:
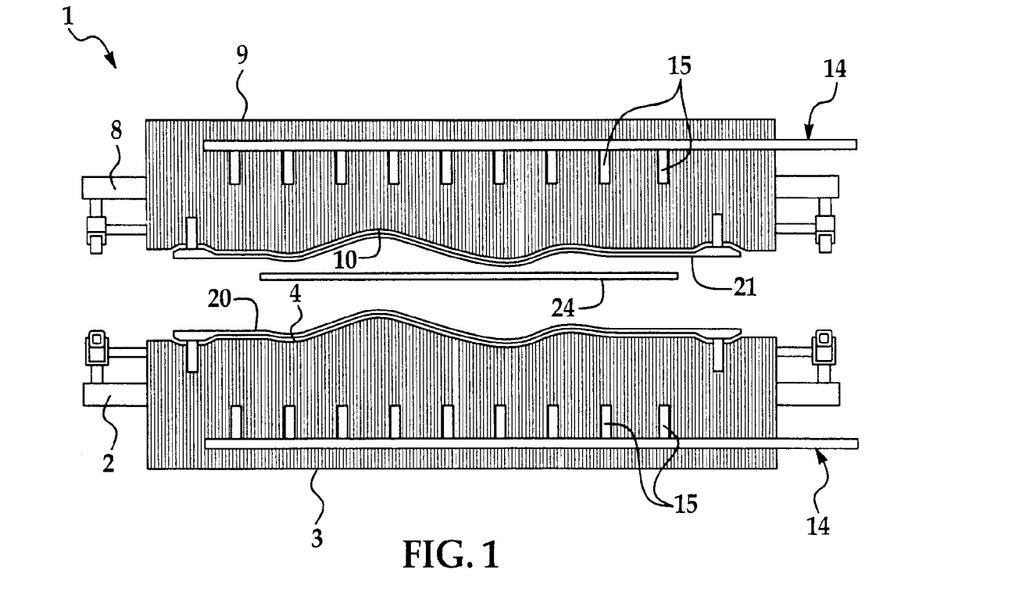
FIG. 1 is a sectional view of a pair of tooling dies of a stacked tooling apparatus, with molding compounds positioned between the tooling dies.
Figure 2:
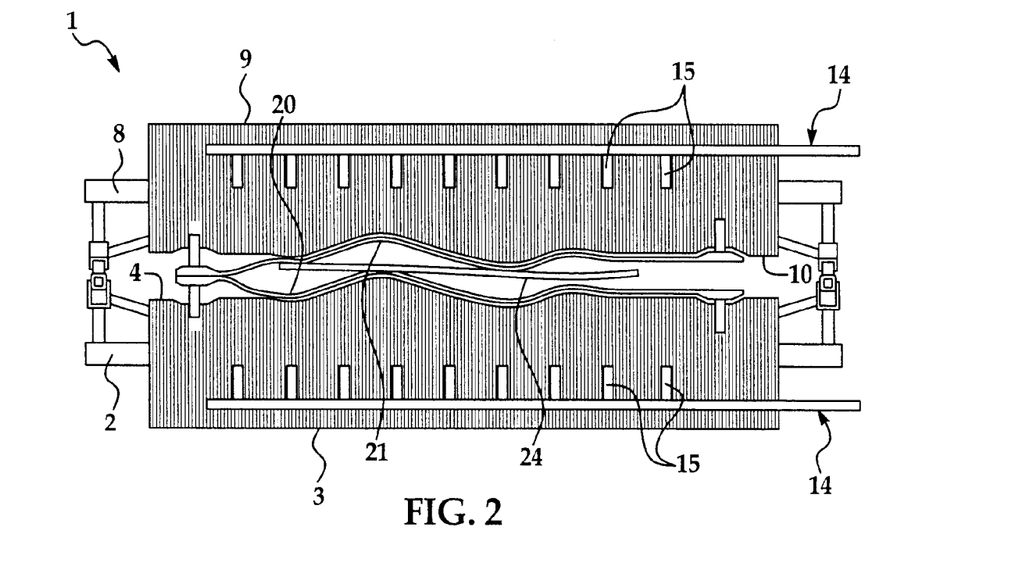
FIG. 2 is a sectional view of a pair of tooling dies, with the molding compounds enclosed between a pair of die susceptors provided on the tooling dies.
Figure 3:
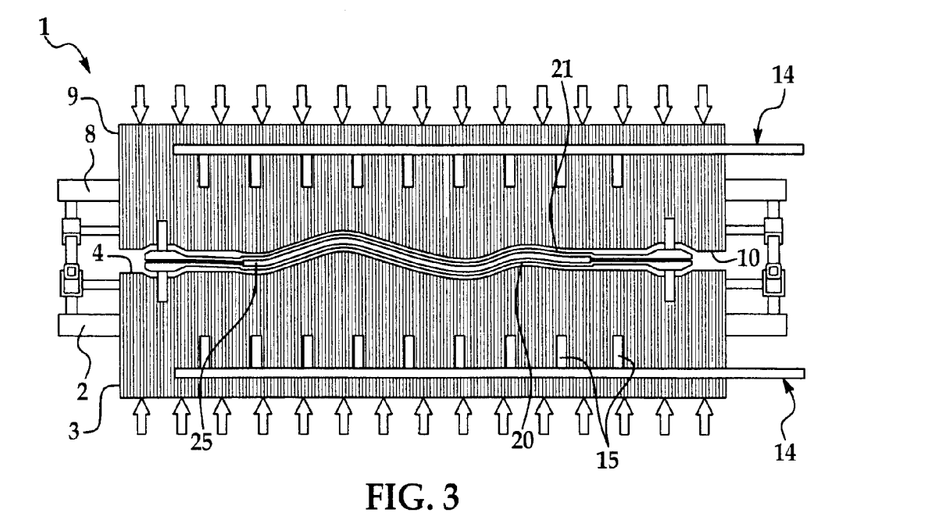
FIG. 3 is a sectional view of the tooling dies, with the tooling dies applying pressure to form and consolidate a composite sheet.

In typical implementation of the composite fabrication method, molding compounds 24 are initially positioned between the first tooling die 3 and the second tooling die 9 of the stacked tooling apparatus 1, as shown in FIG. 1. The first tooling die 3 and the second tooling die 9 are next moved toward each other, as shown in FIG. 2, as the induction coils 26 (FIG. 6) heat the first tooling die 3 and the second tooling die 9 as well as the first die susceptor 20 and the second die susceptor 21. Therefore, as the first tooling die 3 and the second tooling die 9 close toward each other, the first die susceptor 20 and the second die susceptor 21 rapidly heat the molding compounds 24. Thus, the molding compounds 24 which may be thermally molded as the first tooling die 3 and the second tooling die 9 continue to approach and then close against the molding compounds 24, as shown in FIG. 2, forming the molding compounds 24 to the configuration of a composite sheet 25 (shown in FIGS. 3-5) which may be defined by the first contoured surface 4 of the first tooling die 3 and the second contoured surface 10 of the second tooling die 9.

As shown in FIG. 4, the cooling system 14 is next operated to apply the cooling medium 17 to the first tooling die 3 and the second tooling die 9 and to the first die susceptor 20 and the second die susceptor 21. Therefore, the cooling medium 17 actively and rapidly cools the first tooling die 3 and the second tooling die 9 as well as the first die susceptor 20 and the second die susceptor 21, also cooling the composite sheet 25 sandwiched between the first die susceptor 20 and the second die susceptor 21. The composite sheet 25 remains sandwiched between the first tooling die 3 and the second tooling die 9 for a predetermined period of time until complete cooling of the composite sheet 25 has occurred. This allows the molded and consolidated composite sheet 25 to retain the structural shape which is defined by the first contoured surface 4 and the second contoured surface 10 after the first tooling die 3 and the second tooling die 9 are opened, as shown in FIG. 5. The formed and cooled composite sheet 25 is removed from the stacked tooling apparatus 1 without loss of dimensional accuracy or delamination of the composite sheet 25 when it is cooled at an appropriate property-enhancing rate.

Figure 11:
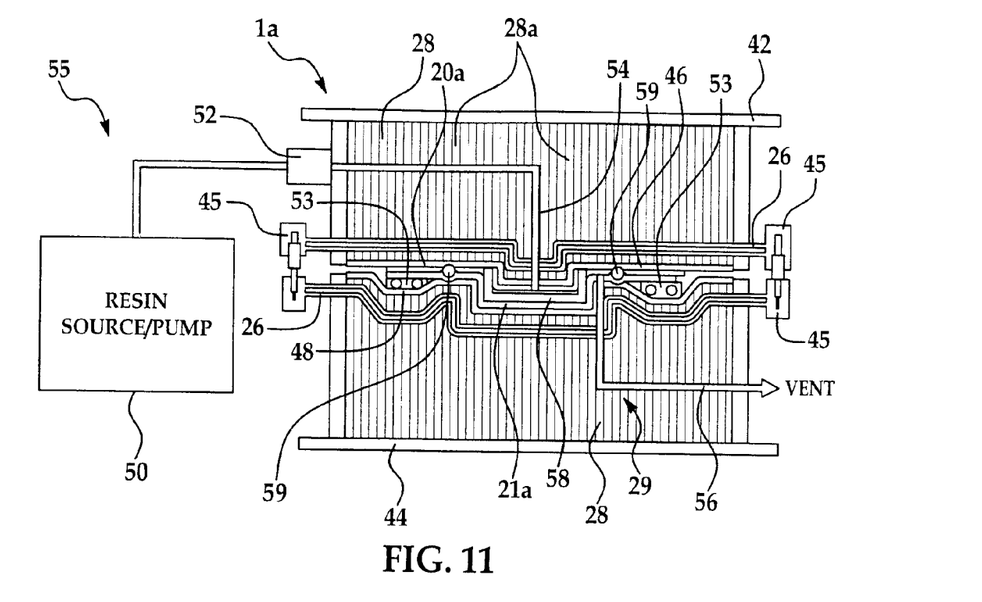
FIG. 11 is a sectional view similar to FIG. 9, but showing the dies having been closed in order to apply pressure to form and consolidate the resin infused preform.
Figure 12:
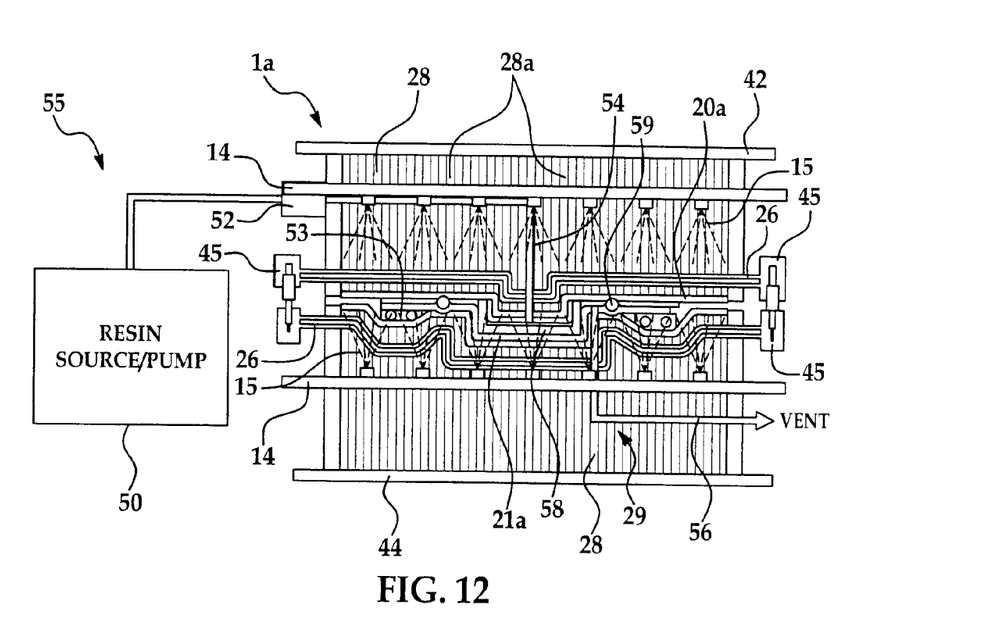
FIG. 12 is a sectional view similar to FIG. 11 but showing a cooling system having been engaged to cool the part.
Figure 13:
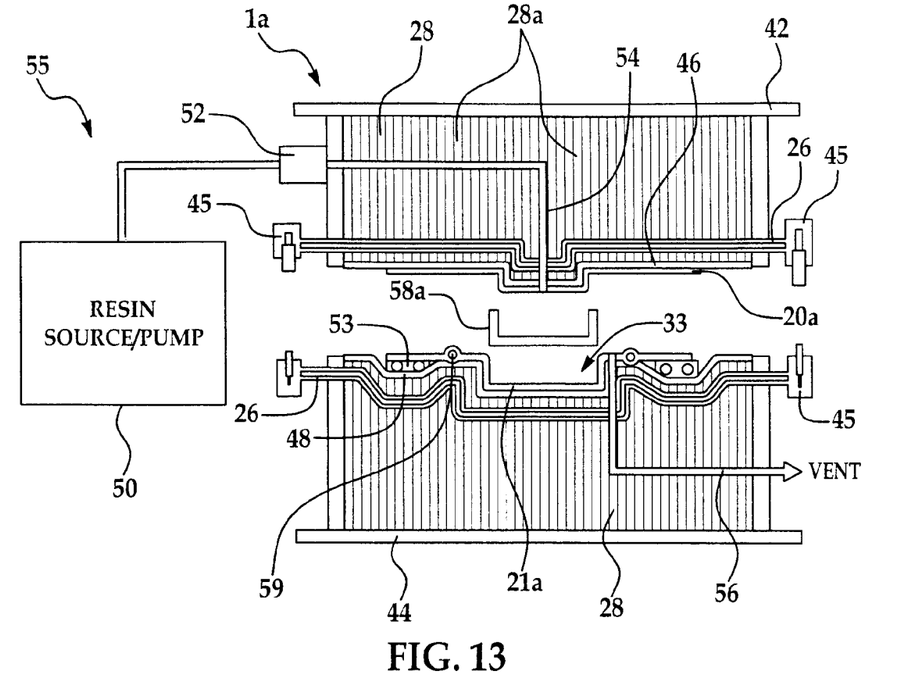
FIG. 13 is a sectional view showing the dies having been opened and a fully formed part being removed from the mold cavity.

Attention is now directed to FIGS. 8-14 which illustrate a resin transfer mold apparatus 1a that may be employed to mold a composite part 58a (FIG. 13). A pair of tooling dies 28 generally similar to those described previously with respect to FIGS. 1-7, are respectively secured to molding press platens 42, 44, allowing the dies 28 to be opened and closed. Like the previously described embodiment, dies 28 comprise a plurality of stacked metal sheets 28a separated by air gaps that form passageways 29 between the sheets 28a. As previously pointed out, the use of spaced apart metal plates 28a reduces the overall thermal mass of the die assembly 1a and facilitates more rapid cooling of a formed part 58a.

The dies 28 may include inductive heating coils that are electrically connected together by a socket connection 45 when the dies 28 are closed. The dies 28 have opposed surfaces that are contoured and generally match contoured mold surfaces 31 (FIG. 10) of a pair of susceptors 20a, 21a. The contoured molding surfaces 31 of the susceptors 20a, 21a match those of the finished composite part 58a, and form a molding cavity 33. The susceptors 20a, 21a are electrically insulated from the dies 28 by respectively associated dielectric shells 46, 48 which may comprise, for example, without limitation, alumina or silicon carbide. The susceptors 20a, 21a may comprise a thermally conductive material such as, but not limited to, a ferromagnetic material, cobalt, nickel or compounds thereof. A water cooled shoe 53 contacts the lower peripheral edges of the susceptors 20a, 21a to aid in cooling the susceptors 20a, 21a, as will be described below. The coils 26 as well as a cooling system 14 are controlled by a suitable temperature control system 65 that control heating up and cooling down the susceptors 20a, 21a.

Figure 8:
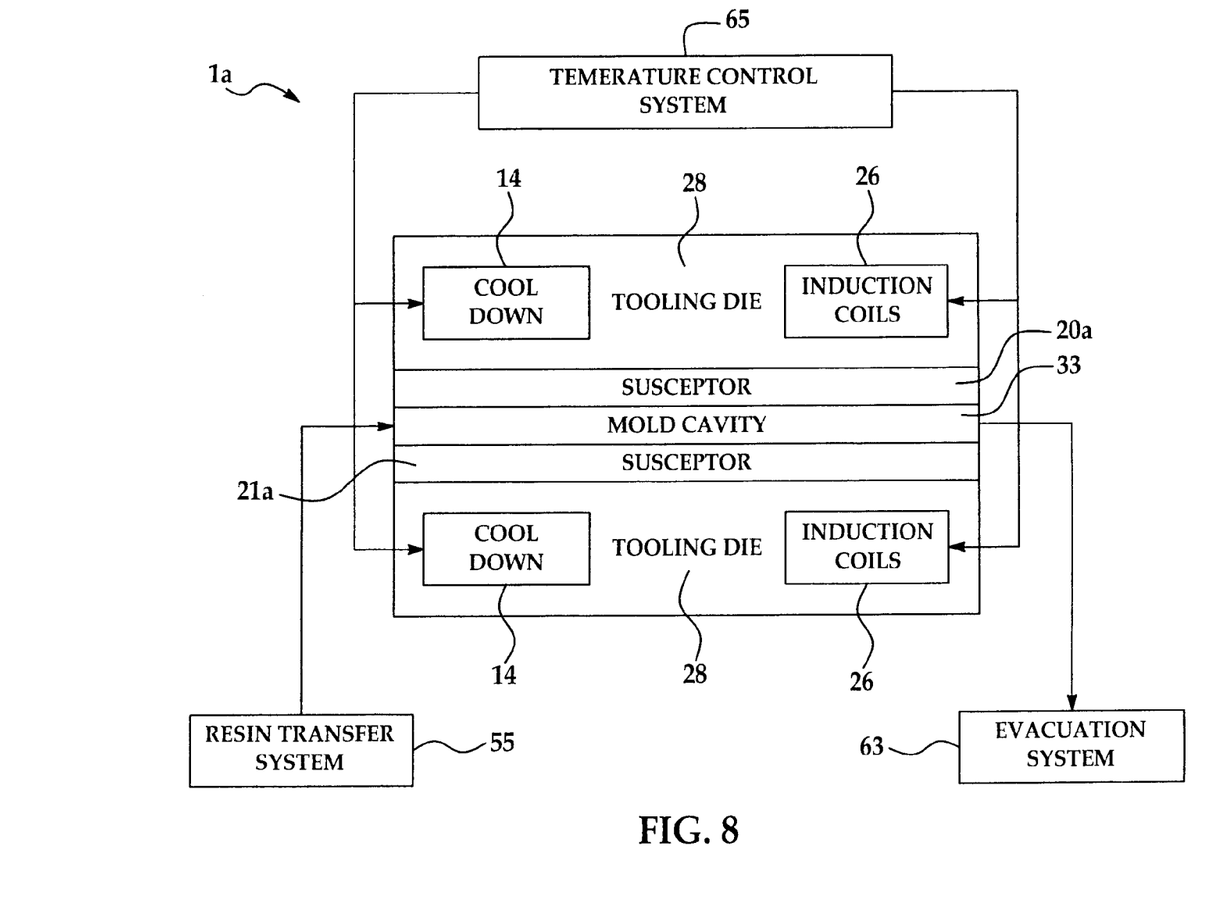
FIG. 8 is a functional block diagram of an alternate embodiment of a resin transfer molding apparatus.

A resin transfer system 55 comprises a source of resin along with the pump 50 for transferring resin to the mold assembly 1a. In some cases, a catalyst may be added to the resin which is combined and mixed at a mixing head 52 before being delivered through a supply line 54 to the mold cavity 33. The resin may comprise any of the resins typically used in resin transfer molding, including, but not limited to, polyester, vinylester, epoxy, phenolic and methyl methacylates, which may include pigments and fillers, if required.

Figure 9:
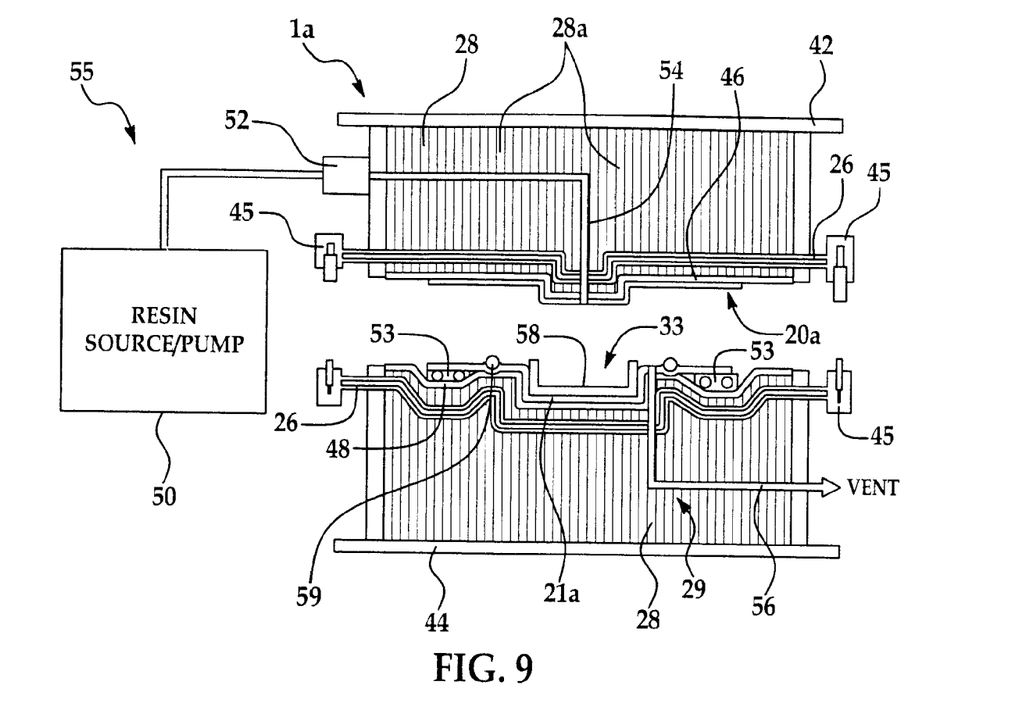
FIG. 9 is a sectional view illustrating the apparatus of FIG. 8, the tooling dies having been opened and a preform having been loaded into the mold cavity.
Figure 10:
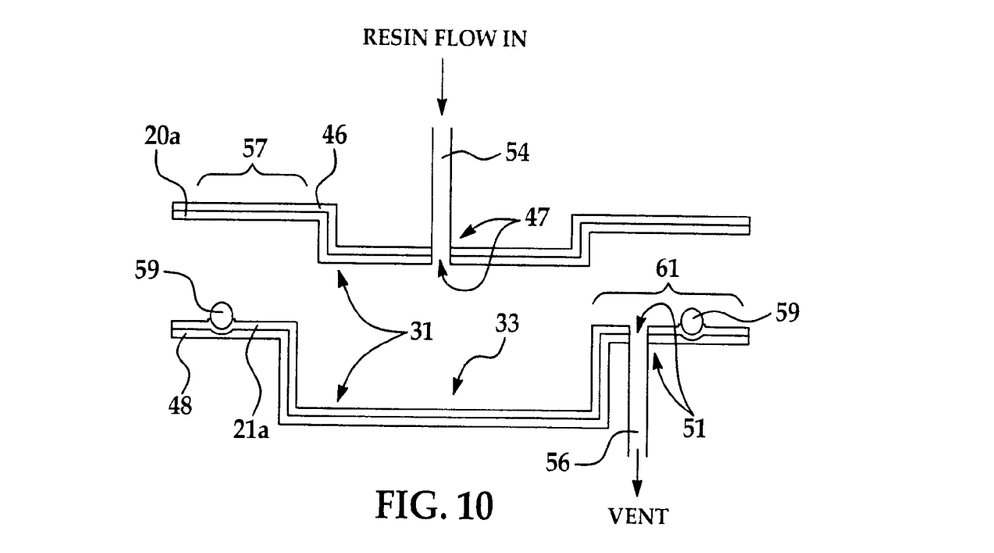
FIG. 10 is a sectional view of the susceptors forming part of the tooling dies shown in FIG. 9, and better depicting openings in the susceptors through which resin may flow into and out of the mold cavity.

As shown in FIG. 9, the resin supply line 54 is connected to aligned openings 47 in susceptor 20a and dielectric shell 46. However, the supply line 54 may be connected to the mold cavity 33 at other areas of the susceptor 20a that would allow resin to flow into the mold cavity 33. For example, the supply line 54 may be connected to openings (not shown) along a flange portion 57 of the susceptor 20a.

In order to assure that the mold cavity 33 is completely filled with resin, a vent line 56 may be provided which allows excess or overflow resin to leave the mold cavity 33. In the illustrated example, the vent line 56 is connected to aligned openings 51 in a flange portion of the susceptor 21a and dielectric shell 48. Other techniques for allowing excess resin to be removed from the mold cavity 33, including the provision of a seal 59 that possesses characteristics such that it normally seals the mold cavity 33 but yields slightly to allow the escape of excess or overflow resin from the mold cavity due to the pressure applied to the seal 59 by the pressurized resin. The seal 59 may be formed from, for example, without limitation, an elastomer material.

Referring now simultaneously to FIGS. 8-14 a resin transfer molding method begins at step 62 (FIG. 14) with the installation of the susceptors 20a, 21a on the dies 28 and loading of a preform 58 into the die cavity 33. The preform 58 may comprise a dry fiber reinforcement in the form of continuous strand, cloth, woven roving, long fibers or chopped strand, any of which may be, without limitation, glass, carbon, arimid or a combination thereof. FIG. 9 shows the susceptors 20a, 21a having been installed and a fiber preform 58 loaded into the mold cavity 33. Next, at step 64, the dies 28 are closed as shown in FIG. 11, thereby closing the susceptor halves 20a, 21a, resulting in the mold cavity 33 being sealed. As the dies close, the coils 26 are electrically connected by the socket connections 45. The seal 59 seals the mold cavity 33 around the periphery of the susceptors 20a, 21a. With the susceptors 20a, 21a having been sealed, the mold cavity is then evacuated through vent 56 or other vacuum connections (not shown) that are connected to an evacuation system 63, creating negative pressure within the mold cavity 33.

Figure 14:
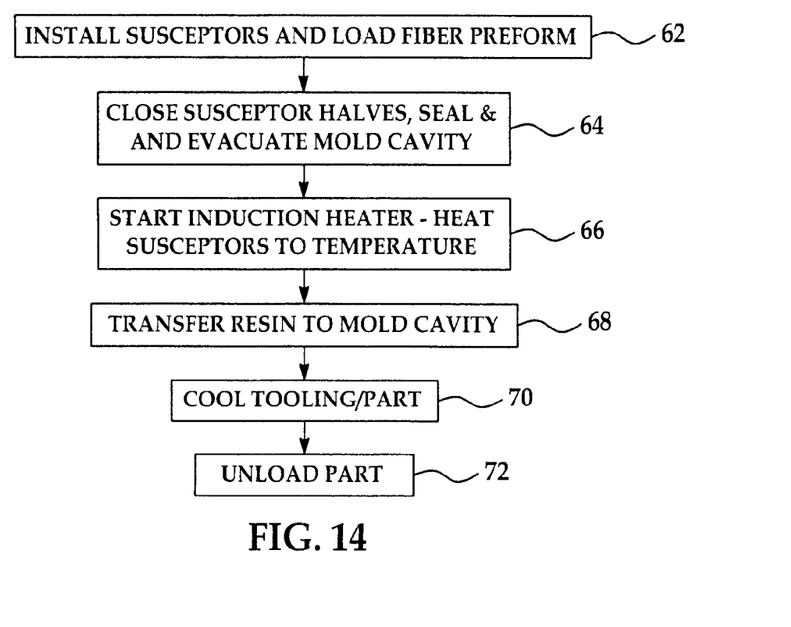
FIG. 14 is a flow diagram illustrating the steps of a method for resin transfer molding a composite part.

At step 66, the induction coils 26 are energized, causing the susceptors 20a, 21a to be inductively heated to temperature. When the susceptors 20a, 21a have been heated to a threshold temperature, resin is pumped from the source through the mixing head 52, as shown at step 68, and flows into the mold cavity 33 through the supply line 54. The negative pressure within the mold cavity aids in drawing the resin into the mold cavity 33 from the supply line 54. The resin entering mold cavity 33 flows through and infuses the dry preform 58. The resin continues to flow into the mold cavity 33 under pressure until the mold cavity 33 is filled. Any excess resin may leave the mold cavity 33 through a vent line 56 or by passing across the seal 59 which may yield slightly, allowing the excess resin to flow therepass. The susceptors 20a, 21a remain at an elevated temperature as part of the process to cure the infused preform 58 for the requisite period of time.

After the susceptors 20a, 21a have been held at the requisite temperature for a prescribed length of time, the part 58a is cooled at step 70, as shown in FIGS. 12 and 14. This cooling process may include engaging the cooling system 14 in which a cooling medium such as fluid, air, etc. is discharged from nozzles 15. The cooling medium flows through the passageways 29, and passes over the surface of the dielectric shells 46 48, thereby cooling the susceptors 20a, 21a, and carrying heat away from the finished part 58a.

Finally, as shown in FIGS. 13 and 14, the remaining step 72 comprises separating the dies 28 and removing the finished part 58a from the mold cavity 33. Since the susceptors 20a, 21a have been rapidly cooled down, they may be quickly removed and exchanged for susceptors having a different contour in order to mold different parts and increase production rate.

Figure 15:
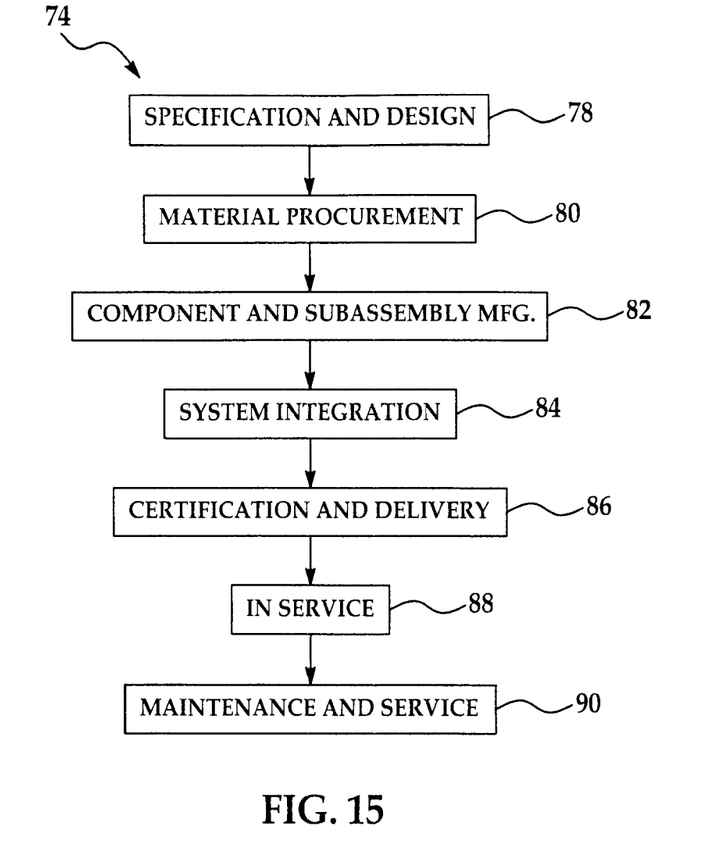
FIG. 15 is a flow diagram of an aircraft production and service methodology.
Figure 16:
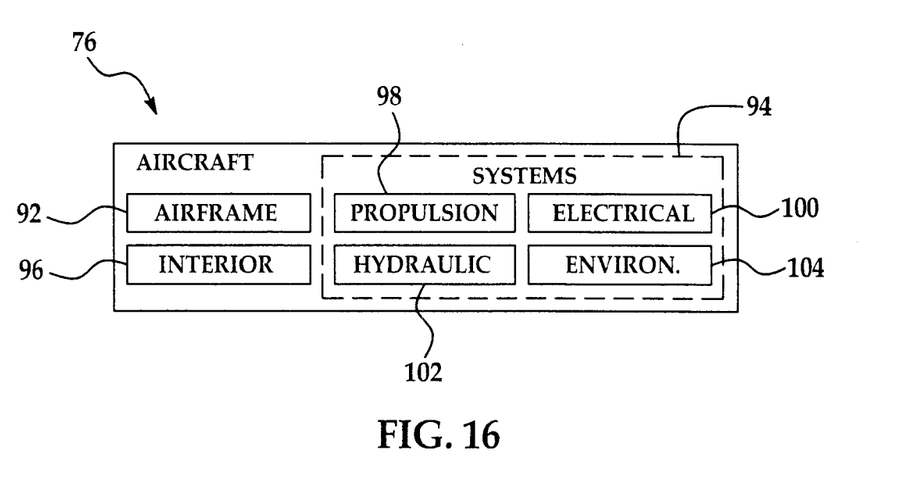
FIG. 16 is a block diagram of an aircraft.

Referring next to FIGS. 15 and 16, embodiments of the disclosure may be used in the context of an aircraft manufacturing and service method 74 as shown in FIG. 15 and an aircraft 76 as shown in FIG. 16. Aircraft applications of the disclosed embodiments may include, for example, without limitation, composite stiffened members such as fuselage skins, wing skins, control surfaces, hatches, floor panels, door panels, access panels and empennages, to name a few. During pre-production, exemplary method 74 may include specification and design 78 of the aircraft 76 and material procurement 80. During production, component and subassembly manufacturing 82 and system integration 84 of the aircraft 76 takes place. Thereafter, the aircraft 76 may go through certification and delivery 86 in order to be placed in service 88. While in service by a customer, the aircraft 76 is scheduled for routine maintenance and service 90 (which may also include modification, reconfiguration, refurbishment, and so on).

Each of the processes of method 74 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 76 produced by exemplary method 74 may include an airframe 92 with a plurality of systems 94 and an interior 96. Examples of high-level systems 94 include one or more of a propulsion system 98, an electrical system 100, a hydraulic system 102, and an environmental system 104. Any number of other systems may be included. Although an aerospace example is shown, the principles of the invention may be applied to other industries, such as the automotive industry.

The apparatus embodied herein may be employed during any one or more of the stages of the production and service method 74. For example, components or subassemblies corresponding to production process 82 may be fabricated or manufactured in a manner similar to components or subassemblies produced while the aircraft 76 is in service. Also, one or more apparatus embodiments may be utilized during the production stages 82 and 84, for example, by substantially expediting assembly of or reducing the cost of an aircraft 76. Similarly, one or more apparatus embodiments may be utilized while the aircraft 76 is in service, for example and without limitation, to maintenance and service 90.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A resin transfer molding apparatus, comprising:
a first tooling die and a second tooling die each tooling die comprising a plurality of stacked metal sheets positioned in generally perpendicular position relative to a contoured surface of each tooling die, the plurality of stacked metal sheets configured substantially adjacent to each other and having air gaps between individual stacked metal sheets, the air gaps forming a plurality of cooling passageways for passing a cooling medium therethrough;
first and second susceptors respectively mounted on the first tooling die and second tooling die, the first and second susceptors including the contoured surfaces in facing configuration and defining a mold cavity for molding a part;
a temperature control system including induction coils inductively coupled with the first and second susceptors;
a resin transfer system for delivering resin from a resin source to the mold cavity; and
means for introducing said cooling medium into the cooling passageways.

2. The apparatus of claim 1, wherein the means for introducing the cooling medium includes nozzles in the passageways for directing the cooling medium toward the susceptors.

3. The apparatus of claim 1, wherein the tooling dies include contoured faces respectively generally matching the contoured surfaces of the first and second susceptors.

4. The apparatus of claim 1, further comprising a dielectric shell disposed between each of the first and second susceptors and the corresponding tooling die.

5. The apparatus of claim 1 further wherein the metal sheets are spaced apart to define air gaps therebetween.

6. The apparatus of claim 5, wherein the temperature control system further includes means for introducing a cooling medium into the air gaps.

7. The apparatus of claim 1 wherein each of the stacked metal sheets includes an electrically insulating coating.

8. The apparatus of claim 1 wherein each of the first and said second susceptors comprises at least one material selected from the group consisting of a ferromagnetic material, cobalt, iron and nickel.

9. The apparatus of claim 1 wherein at least one of the susceptors includes a vent therein to allow excess resin to escape from the mold cavity.

10. The apparatus of claim 1 wherein at least one of the susceptors includes an opening coupled with the resin transfer system for allowing resin to enter the mold cavity.

11. The apparatus of claim 1, further comprising an evacuation system for evacuating the mold cavity before resin is transferred by the resin transfer system to the mold cavity.

12. The apparatus of claim 11, wherein at least one of the susceptors include a vent therein coupled with the evacuation system.

13. A resin transfer molding apparatus, comprising:
a first tooling die and a second tooling die, each tooling die comprising a plurality of stacked metal sheets positioned in generally perpendicular position relative to a contoured surface of each tooling die, the plurality of stacked metal sheets configured substantially adjacent to each other and having air gaps between individual stacked metal sheets, the air gaps forming a plurality of cooling passageways configured to pass a cooling medium therethrough, the contoured surface of each tooling die comprising matching contoured faces and the plurality of passageways extending generally transverse to the contoured faces;
first and second susceptors respectively mounted on the contoured faces of the tooling dies and including contoured surfaces defining a mold cavity for molding a part;
a temperature control system including
induction coils inductively coupled with the first and second susceptors for heating the first and second susceptors, and
means for delivering coolant through the passageways to cool the first and second susceptors; and,
a resin transfer system coupled with the tooling dies for delivering resin from a resin source to the mold cavity.

14. The apparatus of claim 13, further comprising a dielectric shell disposed between each of the first and second susceptors and a corresponding tooling die.

15. The apparatus of claim 13, wherein each of the tooling dies includes a plurality of stacked metal sheets, and the passageways are defined between the metal sheets.

16. The apparatus of claim 15, wherein each of the stacked metal sheets includes an electrically insulating coating.

17. The apparatus of claim 13, wherein each of the first and said second susceptors comprises at least one material selected from the group consisting of a ferromagnetic material, cobalt, iron and nickel.

18. The apparatus of claim 13, wherein at least one of the first and second susceptors includes a vent therein to allow excess resin to escape from the mold cavity.

19. The apparatus of claim 13, wherein at least one of the first and second susceptors includes an opening coupled with the resin transfer system for allowing resin to enter the mold cavity.

20. The apparatus of claim 13, wherein the coolant delivery means includes coolant conduits passing through the tooling dies.

21. The apparatus of claim 20, wherein the coolant delivery means includes nozzles coupled with the coolant conduits for directing the coolant through the passageways toward the susceptors.

* * * * *

UNITED STATES PATENT AND TRADEMARK OFFICE
Certificate

Patent No. 8,708,691 B2                    Patented: April 29, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Marc R. Matsen, Seattle, WA (US); and Kim E. Peterson, Bellevue, WA (US).

Signed and Sealed this Eleventh Day of November 2014.

YOGENDRA GUPTA
*Supervisory Patent Examiner*
Art Unit 1744
Technology Center 1700